Figure 12:
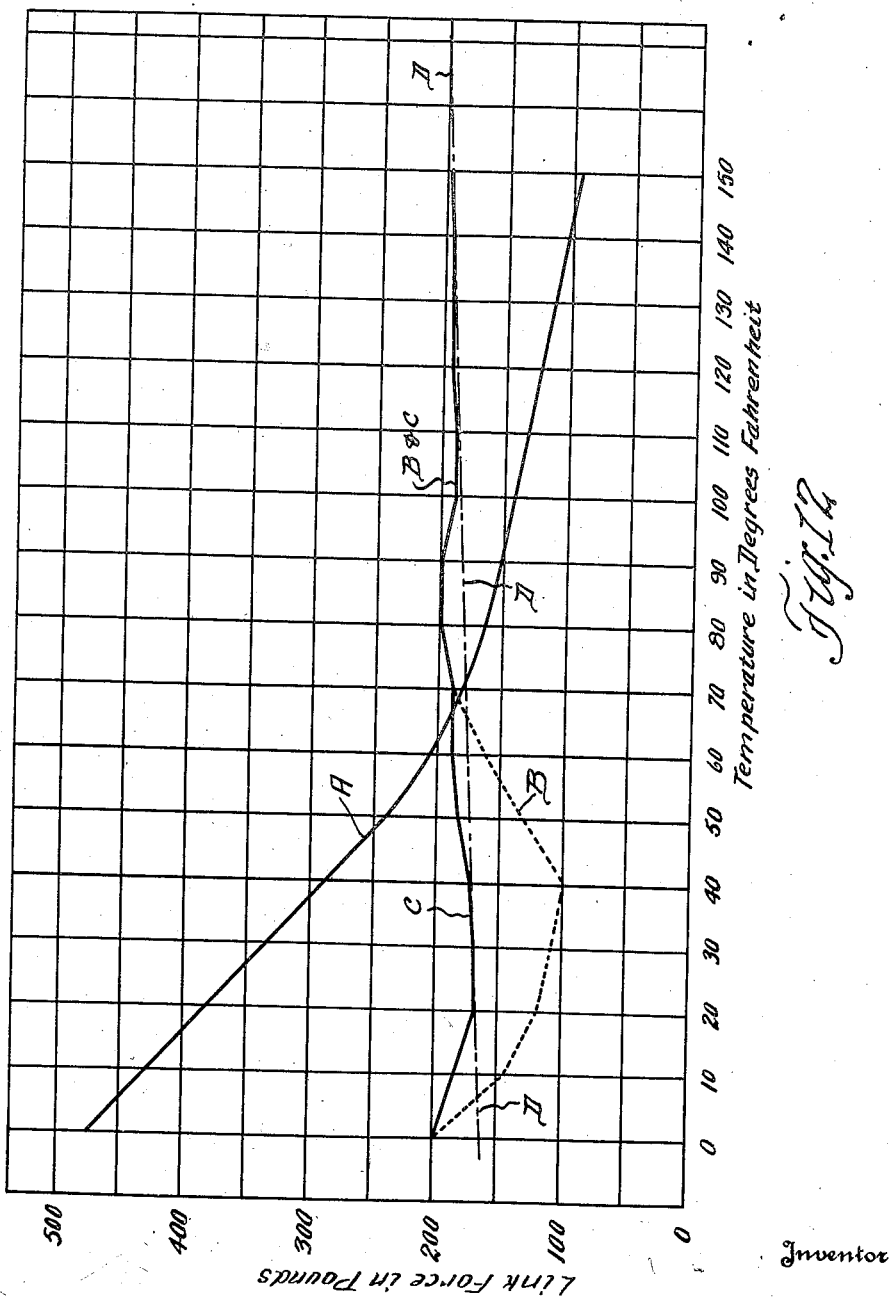

May 30, 1933. E. L. BEECHER 1,911,545
HYDRAULIC SHOCK ABSORBER AND CONTROL MEANS THEREFOR
Filed May 4, 1932 6 Sheets-Sheet 1
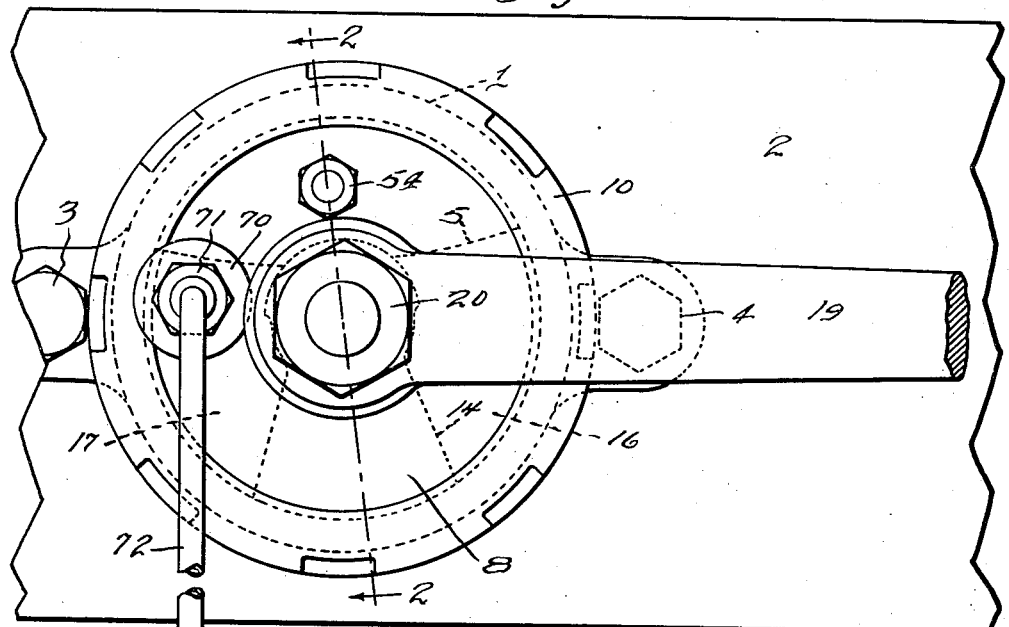
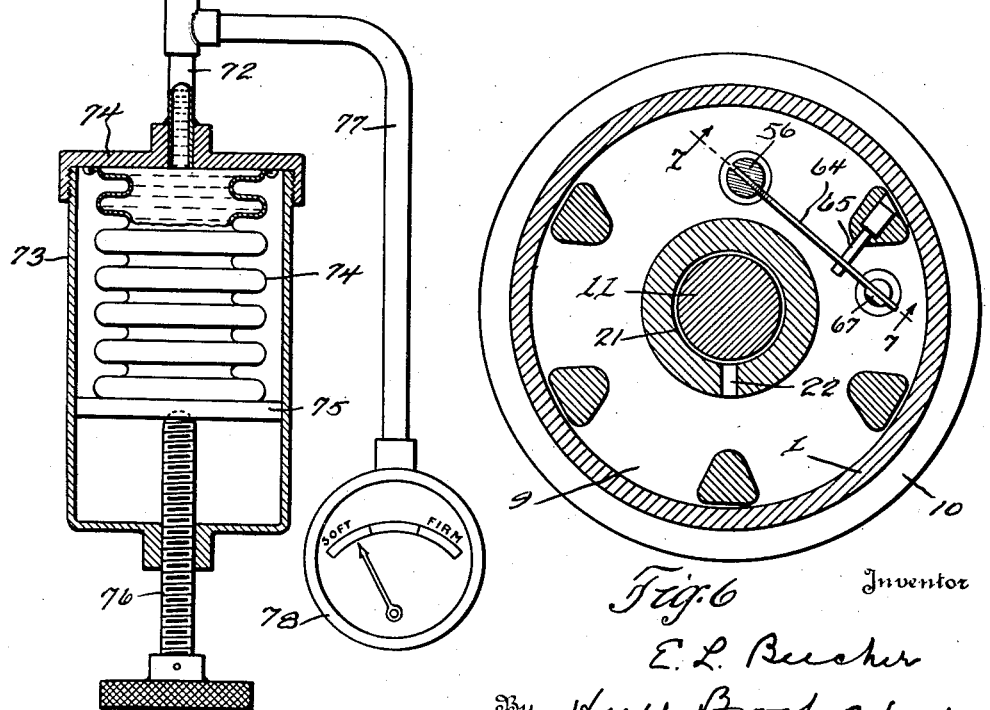
Inventor
E. L. Beecher
By Hull, Brock West
Attorney

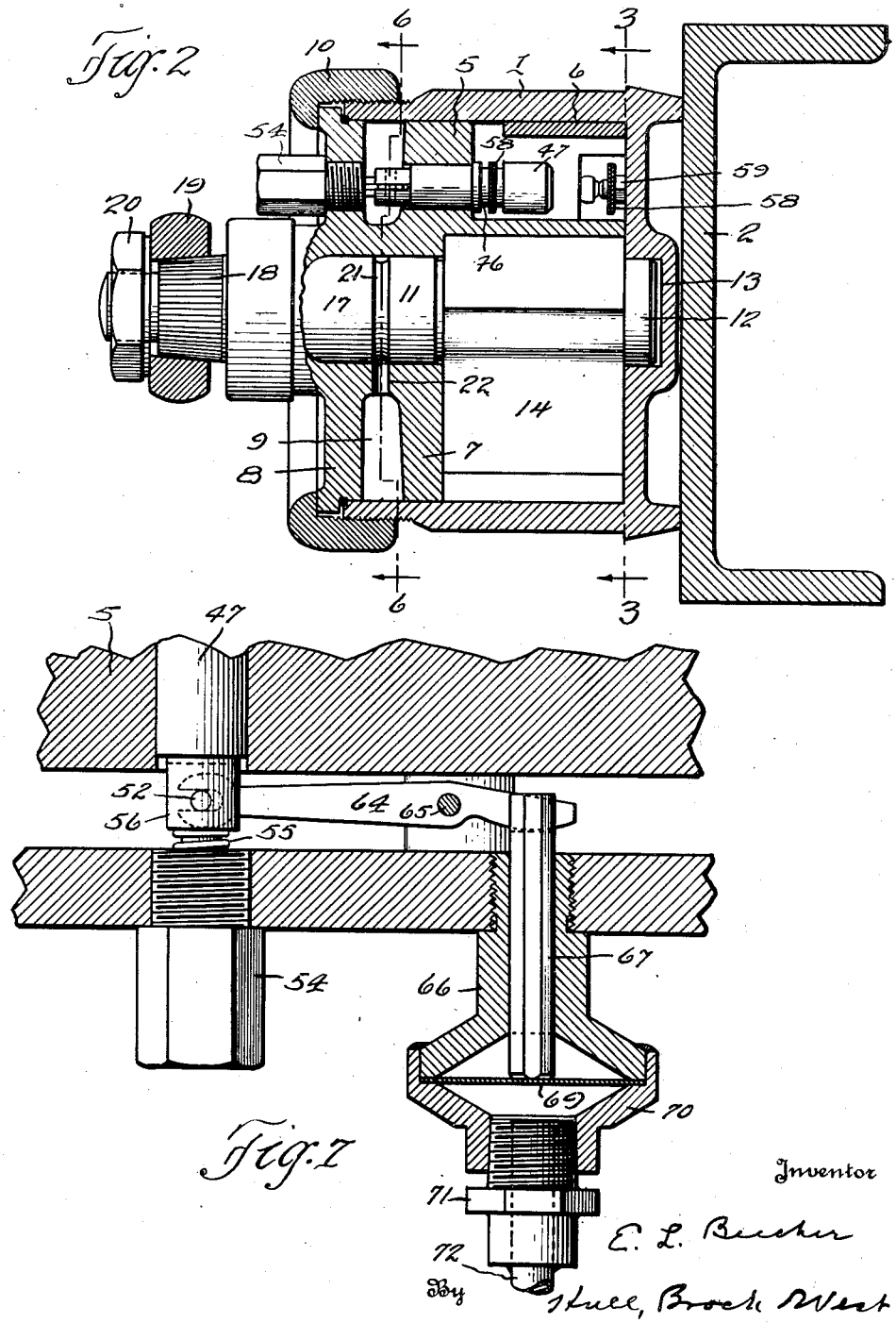

May 30, 1933.  E. L. BEECHER  1,911,545
HYDRAULIC SHOCK ABSORBER AND CONTROL MEANS THEREFOR
Filed May 4, 1932  6 Sheets-Sheet 3
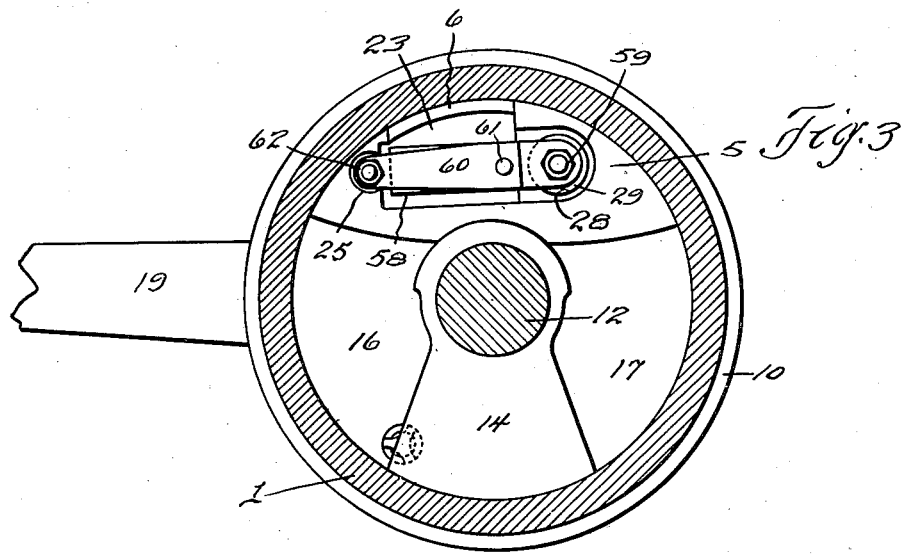
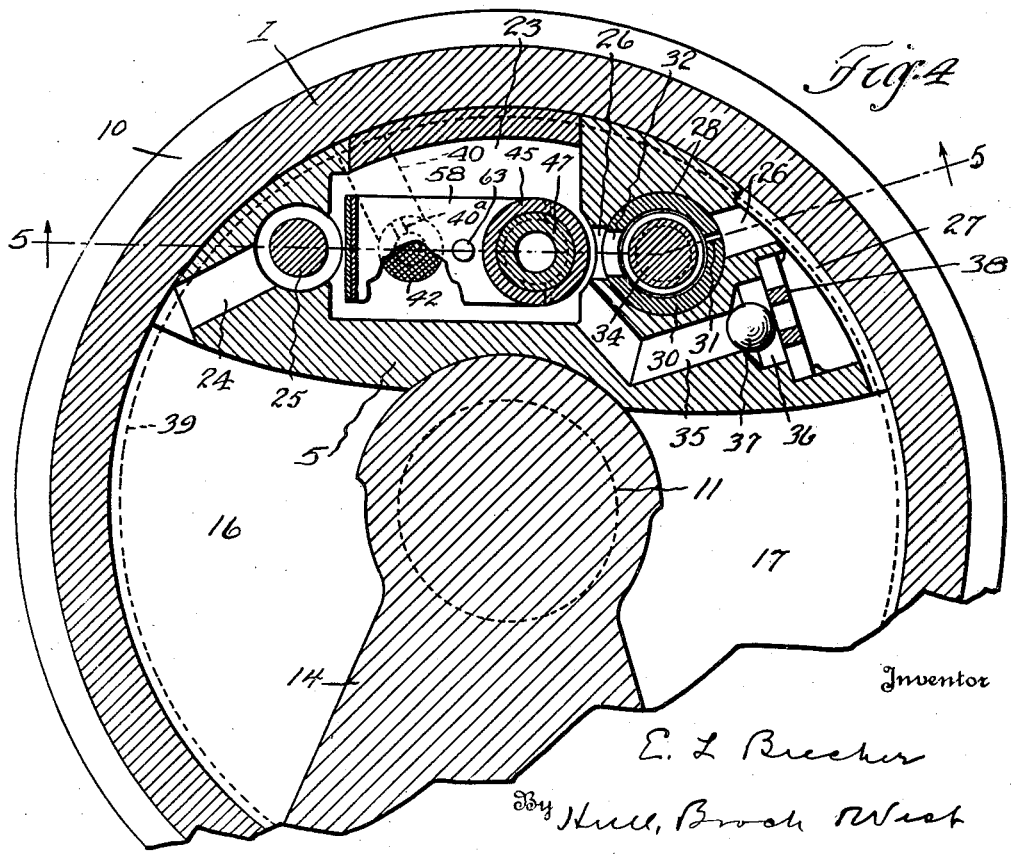
Inventor
E. L. Beecher
By Hull, Brock & West
Attorney May 30, 1933.  E. L. BEECHER  1,911,545
HYDRAULIC SHOCK ABSORBER AND CONTROL MEANS THEREFOR
Filed May 4, 1932   6 Sheets-Sheet 4
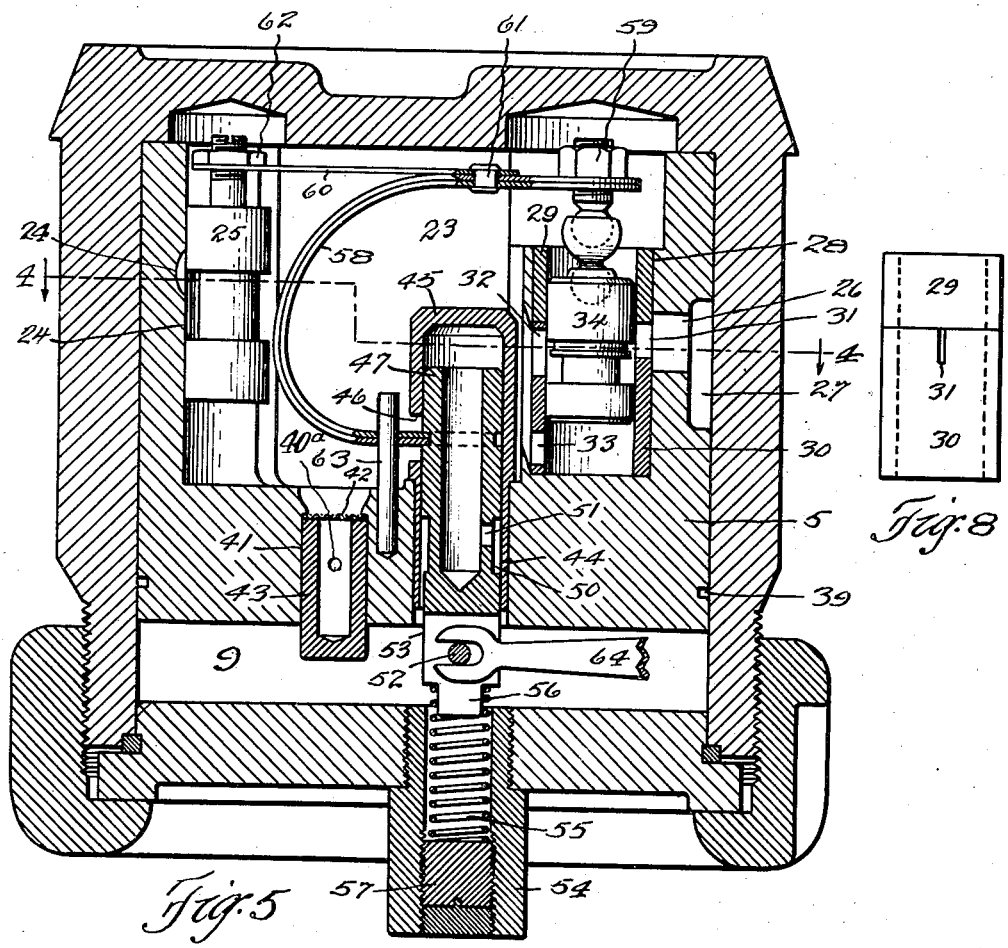
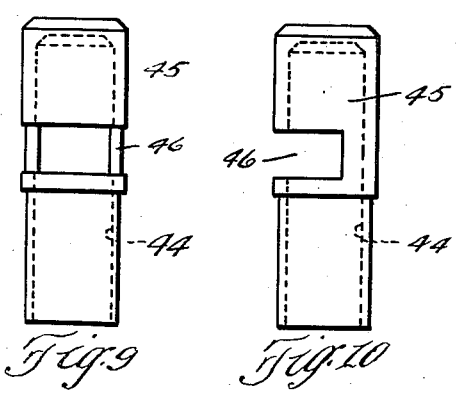
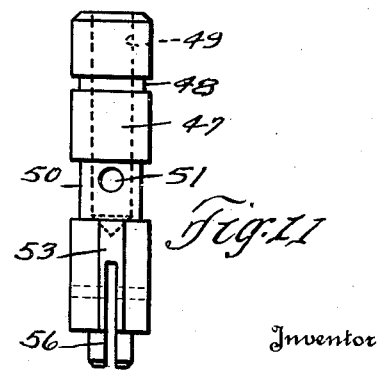
Inventor
E. L. Beecher
By Hull, Brook & West
Attorney

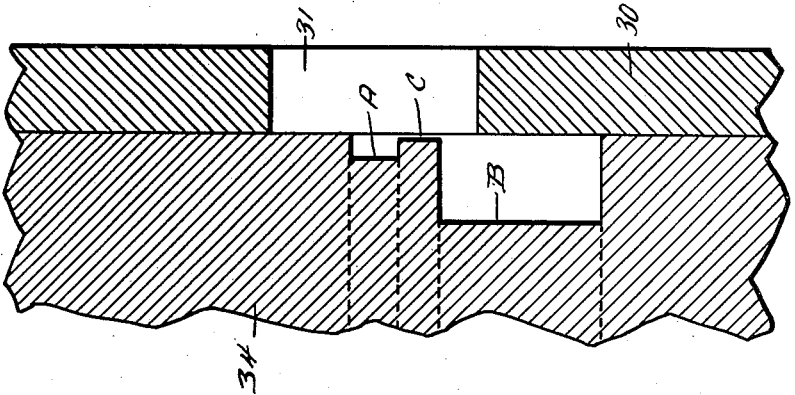
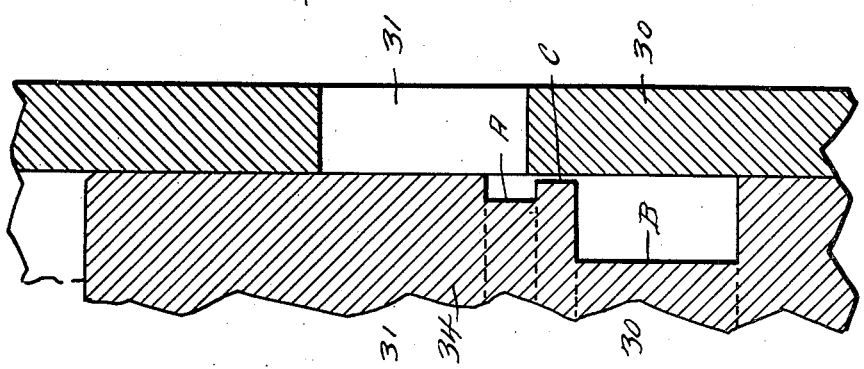
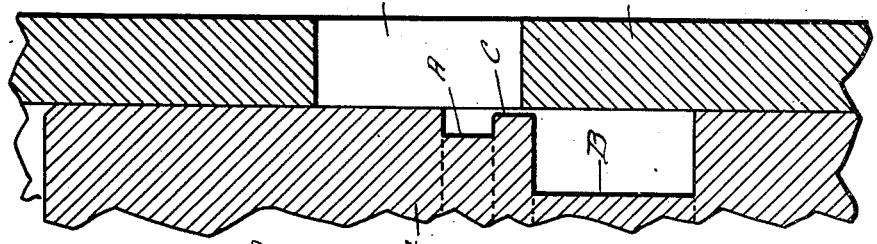
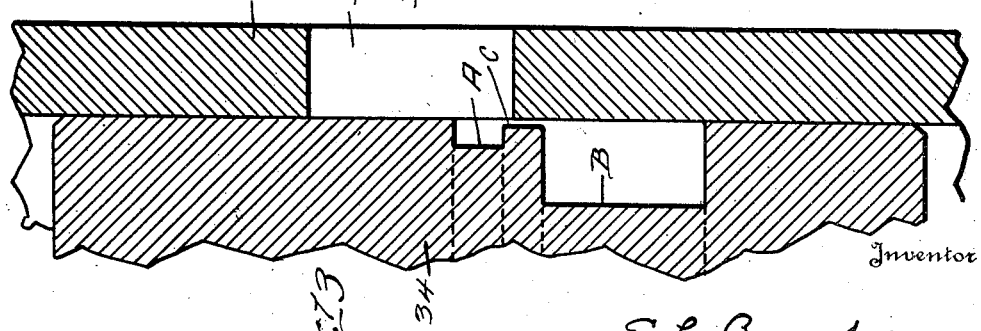

Patented May 30, 1933

1,911,545

UNITED STATES PATENT OFFICE

EUGENE LESTER BEECHER, OF EAST CLEVELAND, OHIO, ASSIGNOR TO THE GABRIEL COMPANY, OF CLEVELAND, OHIO, A CORPORATION OF OHIO

HYDRAULIC SHOCK ABSORBER AND CONTROL MEANS THEREFOR

Application filed May 4, 1932. Serial No. 609,198.

This invention relates generally to hydraulic shock absorbers and more particularly to hydraulic shock absorbers of the type shown in my co-pending application Serial No. 523,290, filed March 17, 1931.

The main object of the invention is to provide a hydraulic shock absorber of the character described which will tend to check the relative movement between the vehicle body and axle and in which the resistance to such movement may be varied as desired and which is maintained substantially constant irrespective of normal temperature changes.

Another object of the invention is to provide a hydraulic shock absorber of the character herein described which will tend to check the relative movement between the vehicle body and axle and which is provided with manually operated remote control means accessible to the driver of the vehicle for varying such resistance as desired and which is also provided with thermostatically controlled means for maintaining such adjustment under normal operating conditions.

A further object of the invention is to provide a hydraulic shock absorber in which the flow of liquid from the high pressure to the low pressure side of the piston is controlled by means of a specially designed valve which may be adjusted by remote control means accessible to the driver of the vehicle, which valve is maintained in adjustment by thermostatically controlled means.

Another object of the invention is to provide a hydraulic shock absorber of the character described and having a specially designed valve for controlling the flow from the high pressure to the low pressure side of the piston, together with means for adjusting the same, such adjusting means being hydraulically or pneumatically controlled thus avoiding all non-rigid connections which may wear or have lost motion.

Further and more limited objects of the invention will appear as the description proceeds and by reference to the accompanying drawings in which Fig. 1 is a view partly in side elevation and partly in section disclosing my improved shock absorber secured to the frame of an automotive vehicle, together with the connections for adjusting the same; Fig. 2 is a vertical sectional view of the shock absorber shown in Fig. 1; Fig. 3 is a sectional view on the line 3—3 of Fig. 2; Fig. 4 is a horizontal sectional view on the line 4—4 of Fig. 5; Fig. 5 is a sectional view on the line 5—5 of Fig. 4; Fig. 6 is a sectional view on the line 6—6 of Fig. 2; Fig. 7 is a fragmentary sectional view on the line 7—7 of Fig. 6; Fig. 8 is a view in front elevation of the sleeve or bushing into which fits the valve controlling the flow from the high pressure to the low pressure side of the piston; Fig. 9 is a view in side elevation of the sleeve into which fits the plunger for adjusting the position of the valve; Fig. 10 is a similar view of the valve shown in Fig. 9 but at right angles thereto; Fig. 11 is a view in side elevation of the plunger which fits into the sleeve shown in Figs. 9 and 10; Fig. 12 is a graphic diagrammatic view showing the relationship between link force in pounds and the temperature in degree Fahrenheit and disclosing the curve obtained under different conditions Figs. 13 to 16 inclusive are fragmentary sectional views disclosing different positions of the valve member for controlling the flow from the high pressure to the low pressure side of the vehicle in different positions with respect to its port.

Referring now to the drawings, and particularly Figs. 1 to 5 inclusive, the shock absorber consists essentially of a cylindrical casing 1 which is secured to the frame 2 of the vehicle by means of suitable bolts 3 and 4. Fitting within the casing 1 is a filler block which is of the same general construction as that disclosed in my co-pending application hereinbefore referred to and which includes an abutment 5 which is non-rotatably secured in the casing and held against movement with respect thereto by means of a key 6 rigidly secured to the casing. The filler block is also provided with opposed spaced portions 7 and 8 which provide a substantially cylindrical auxiliary supply or replenishing reservoir 9. The filler block is secured in the casing by means of a locking ring 10 which is threadedly secured thereover. The filler block is also provided with a central opening through which extends a shaft 11 having a boss 12 thereon which engages in the recess 13 in the bottom of the casing.

Carried by the shaft and preferably formed integral therewith is a piston 14 which cooperates with the abutment and casing to define a pair of working compartments 16 and 17. The outer end of the shaft is provided with a milled portion 18 over which is non-rotatably secured a link or lever 19 which is held in place by a nut 20. The shaft 11 is provided with a peripheral groove 21 which communicates with a bore 22 which leads into the reserve supply reservoir 9 and which tends to prevent leakage about the shaft. The abutment 5 is provided with a cut-away portion substantially centrally thereof which defines a chamber 23. Leading from the chamber 23, is a bore or passageway 24 which connects with the working compartment 16 and arranged within this passageway is a valve 25 for regulating the flow therethrough. The abutment 5 is also provided with a passageway 26 which connects the chamber 23 with a passageway 27 which connects with the working compartment 17. Extending at right angles to the passageway 26 is a bore or passageway 28 in which is rigidly secured a pair of concentric sleeves or bushings 29 and 30. The lower sleeve or bushing 30 in Fig. 5 is provided at one side with a port or slot 31 and at its opposite side with a pair of ports 32 and 33. These bushings or sleeves 29 and 30 are press fitted into the bore 28 so as to be rigidly secured therein.

Fitting within the sleeve or bushings 29 and 30 and slidably mounted therein is a valve 34 which serves to control and regulate the flow of liquid from the high pressure chamber 17 through the abutment to the low pressure chamber 16, the details of which will be hereinafter described.

The abutment 5 is also provided with a bore or passageway 35 which connects the chamber 23 with the bore 27. The bore 35 is provided with an enlarged portion 36 in which is arranged a ball check valve 37 which is held in place by means of a spider 38 of the type disclosed in my co-pending application hereinbefore referred to.

The abutment 5 is also provided with a peripheral groove or passageway 39 and intersecting the groove 39 is a radially disposed bore 40 which connects with a bore 41 leading into the chamber 23. Disposed within the bore 41 is a screen 42 which is held in place by a hollow sleeve 43 having a bore 40ª which connects the bore 40 with the chamber 23. This groove 39 provides a liquid seal which serves to prevent leakage from the high pressure chamber into the reserve supply reservoir 9. Leading from the chamber 23 in the abutment to the reserve supply reservoir 9 is a bore 44 in which is arranged a sleeve 45 shown in detail in Figs. 9 and 10 and which is provided with a port 46. Fitting within the sleeve 45 is a plunger 47 having a peripheral groove 48 therein. The plunger 47 is also provided with an axially extending bore 49 which is connected with the groove 50 by means of a port 51.

The lower end of the plunger 47 is bifurcated and extending therethrough is a pin 52. The lower portion of the plunger 47 is also provided with a flattened portion 53 which serves to provide communication between the groove 50 and the reserve supply reservoir 9. Threadedly secured in the filler block is a hollow plug 54 in which is arranged a coil spring 55 the upper end of which receives the reduced lower end 56 of the plunger. Threadedly secured in the bushing 54 is a plug 57 which engages one end of the coil spring and by means of which the tension of the spring may be adjusted. It will thus be seen that the sleeve 45 and plunger 44 together with the ports hereinbefore described provide communication between the reserve supply reservoir and the chamber 23 and serve to balance the pressure on the opposite ends of the plunger 47.

Disposed within the chamber 23 is a bi-metal thermostat 58, shaped as shown most clearly in Fig. 5, one end of which is secured in the groove 48 in the plunger 47 and the other end of which is connected with the valve 34 by means of a double universal connection which is connected with the thermostat by means of nut 59. The thermostat 58 is also connected with the valve 24 by means of a bi-metal link 60 one end of which is connected with the thermostat 58 by means of a rivet 61 and the other end of which is secured to the valve 34 by means of the nut 62.

Arranged within the chamber 23 is a pin 63 which extends through an opening provided in the thermostat 58 and serves to guide the thermostat. It is of course to be understood that the valve 34 need not necessarily be connected with the thermostat but may be separately and independently adjusted, if desired.

Pivotally mounted in the abutment and disposed within the reserve supply reservoir 9 is a link 64 one end of which engages the pin 52 in the bifurcated lower end of the plunger. The link 64 is pivotally secured to one of the spacing elements in the reserve supply reservoir by means of a pin 65. Threadedly secured in the filler block is a plug 66 through which extends a plunger 67 the inner end of which is bifurcated to receive the opposite end of the link 64.

Fitting over the outer end of the plug 66 is a metallic diaphragm 69 which bears against the plunger 67 and is held in place by means of a cap 70 into which is threadedly secured a tubular fitting 71 from which leads a tube 72. Disposed adjacent the driver's seat of the vehicle is a casing 73 the inner end of which is formed by base member 74 having an opening therein into which the end of the tube 72 is connected. Disposed within the casing 73 is a bellows like chamber 74 preferably formed of sylphon tubing and adapted to contain a suitable liquid. Disposed within the casing 73 and slidably mounted therein is a piston 75 which bears against the pressure chamber 74 and is adapted to be forced inwardly by means of a screw 76 which is threadedly secured in the casing 73 and bears against the piston 75. It will be seen that by screwing the screw 76 inwardly, the pressure on the diaphragm 69 may be increased to actuate the plunger 67 which in turn actuates the link 64 to adjust the position of the plunger 47 and the thermostat 58 and valves 25 and 34. This mechanism is what has been hereinbefore referred to as remote control means for adjusting the position of the valve. It is obvious that either hydraulic or pneumatic pressure may be used to adjust the position of the valve and thermostat. Leading from the tube or conduit 72 is a branch tube or conduit 77 which connects with the suitable gauge 78, having a suitable indicator for indicating the pressure in the chamber 74 and consequently the position of the valve 34. This mechanism may be adjusted to vary the resistance offered to the movement of the piston on the rebound stroke of the piston, and the thermostatically controlled valve serves to maintain this adjustment after it has been set as desired.

The operation of the shock absorber is as follows: Upon movement of the vehicle body toward the axle, the piston 14 will be moved toward the left or clockwise as seen in Fig. 4. The liquid in the chamber 16 will be forced through the passageway 24 and past the valve 25 into the chamber 23 and thence through the passageway 35 and past the ball check valve 37, thence through the passageway 27 to the chamber 17. Upon the rebound stroke of the vehicle body, the piston will be moved in the opposite direction. The liquid in the high pressure chamber 17 cannot escape through the bore 35 because of the fact that the ball check valve 37 will seat. It will therefore be seen that the liquid can escape only through the passageway 27, port 26, port 31 and past the valve 34 and through the ports 32 to the chamber 23 and thence to the low pressure compartment 16 past the valve 25 and through the passageway 24. By controlling the flow through the ports 31, 32, the resistance to the upward movement of the vehicle body may be regulated.

It has been found by experiment that on the rebound stroke of the vehicle body the resistance to the movement of the piston varies due to changes in the temperature of the checking fluid. The temperature of the liquid is raised as a result of being forced through the restricted openings. In Fig. 12 the curve A discloses the relationship between the link force in pounds on the lever 19 and the temperature in degrees Fahrenheit when the liquid is forced through a fixed opening. The curve B in Fig. 12 discloses a relationship between the link force in pounds on the lever 19 and the temperature in degrees Fahrenheit with a thermostatically controlled valve such as shown in my copending application hereinbefore referred to. In order to maintain the resistance of movement of the piston substantially constant for normal temperature changes of say between 0° F. and 150° F., applicant has found it necessary to design a special valve and it is to this valve (valve 34 and control means therefor) that attention is especially directed. This valve is manually adjustable from a point adjacent the driver's seat so that resistance offered to the relative movement between the body and axle may be varied as desired and is also thermostatically controlled to maintain this resistance substantially constant. The resistance to the flow of liquid from the high pressure to the low pressure side of the shock absorber does not vary inversely as the pressure increases or as the viscosity of the liquid increases as might be expected and applicant's valve is designed with these facts in mind and maintains the resistance to the relative movement between the vehicle body and axle substantially constant notwithstanding such varying conditions as the periodicity of the springs of the vehicle, the speed of the piston in the working compartments, the length of the lever arm of the shock absorber, or the size of the shock absorber and the position of the valve 34 with respect to the port 31.

With the valve disclosed and described in this application, the relationship between the link force in pounds and the temperature in degrees Fahrenheit is shown most clearly by the curve C in Fig. 12. The ideal conditions are shown most clearly by the curve D in Fig. 12. From a comparison of these curves, it will be seen that applicant's valve functions almost perfectly and that the resistance offered to the relative movement of the vehicle body and axle is substantially constant over a temperature change of approximately 150°.

In Figs. 13 to 16 inclusive there are disclosed four setting of the valve 34 with respect to the port 31. In Fig. 13 the valve is shown in the position which it would occupy when the shock absorbers are set for a medium ride at 70° F. In Fig. 14 the parts are shown in the position which they would occupy when the shock absorbers are set for a soft ride at 70° F.; in Fig. 15 the parts are shown in the position which they would occupy when set for a hard ride at 70° F., and in Fig. 16 the parts are shown in the position which they would occupy when set for a medium ride at 0° F.

The valve 34 is preferably circular in shape and is provided with an upper passageway or cut-away portion A and a lower passageway or cut-away portion B and an intermediate passageway or cut-away portion C. The cut-away portion A is greater in depth than the cut-away portion C but less in depth than the cut-away portion B. The height of the cut-away portion A is greater than the cut-away portion C but less than the height of the cut-away portion B. The terms "height", "width" and "upper" and "lower" are used with reference to the drawing and not with reference to the position which the shock absorber would occupy when in use. By adjusting the position of the valve, the position of the portion C with respect to the lower edge of the port 31 mainly determines the resistance offered to the relative movement of the vehicle body and axle. The parts shown in Figs. 13 to 16 inclusive are on a greatly enlarged scale and in practice the parts are so positioned that the valve 34 should be moved about .005 of an inch for every 10° change in temperature in order to maintain the resistance substantially constant. After the valve has been set at the desired position by the manually adjustable remote control means, the thermostat serves to maintain the parts in adjustment. The pressure above and below the valve 34 is equal as is the pressure above and below the plunger 47. By adjusting the screw 76, the operator of the vehicle may increase or decrease the resistance offered to the relative movement between the body and axle and when the valve is adjusted the thermostat is also adjusted accordingly. The shock absorber is adjusted at the factory by means of the screw plug 57 to place the proper tension upon the spring 55. After this adjustment is made, a small quantity of solder or similar material is poured over the plug 57 so that it may not be again tampered with and there is no need for any further adjustment except by the manually operated remote control means which is accessible from a point adjacent the driver's seat.

The curves shown in Fig. 12 show the relationship which would exist in a shock absorber on a vehicle the springs of which have a periodicity of 120 strokes per minute. From an inspection of the curve B in Fig. 12 it will be seen that the curve dips considerably between 70° F. and 10° F. By providing the valve with the cutaway or groove portion B and C this dip in the curve is eliminated and a curve such as the curve C is obtained which more closely approximates ideal conditions. It will therefore be seen that the specially designed valve shown in this application materially increases the efficiency of the shock absorber.

It will now be clear that I have provided a shock absorber and control means therefor which will accomplish the objects of the invention as hereinbefore stated. The embodiment of the invention herein disclosed is to be considered merely as illustrative and not in a limiting sense as various changes may be made in the details of construction as well as in the shape, size and arrangement of parts without departing from the spirit of my invention. It is therefore to be understood that the invention is limited only in accordance with the scope of the appended claims.

Having thus described my invention, what I claim is:

1. In a hydraulic shock absorber, the combination of a casing, a piston, a shaft and an abutment arranged within said casing and defining a pair of working compartments, said abutment having a passageway leading therethrough and connecting said pair of working compartments, a valve for regulating the flow through said passageway, a plunger slidably mounted in said abutment, a thermostat having one end connected with said valve and its opposite end connected with said plunger, and means for adjusting the position of said plunger.

2. In a hydraulic shock absorber, the combination of a casing, a piston, a shaft and an abutment arranged within said casing and defining a pair of working compartments, said abutment having a passageway leading therethrough and connecting said pair of working compartments, a valve for regulating the flow through said passageway, a plunger slidably mounted in said abutment, a thermostat having one end connected with said valve and its opposite end connected with said plunger, remote controlled means for adjusting the position of said plunger, and means for balancing the pressure on the opposite ends of said plunger.

3. In a hydraulic shock absorber, the combination of a casing, a shaft in said casing, a member fitting over said shaft and including a piston and an abutment and cooperating with said casing to define a pair of working compartments, a passageway leading through said abutment and connecting said pair of working compartments, a valve for controlling the flow through said passageway, a thermostat arranged within said abutment and having one end connected with said valve, a plunger mounted in said abutment and connected with the opposite end of said thermostat, and remote controlled means for adjusting the position of said plunger.

4. In a hydraulic shock absorber, the combination of a casing, a shaft in said casing, a member fitting over said shaft, a piston and an abutment cooperating with said casing and member to define a reserve supply reservoir and a pair of working compartments, a passageway leading through said abutment and connecting said pair of working compartments and having an enlarged portion, said member being annular in shape and having a peripheral groove therein which cooperates with said casing to define a liquid seal between the working compartments and the reserve supply reservoir, and means connecting said groove with the passageway through said abutment whereby to prevent leakage into the reserve supply reservoir.

5. In a hydraulic shock absorber, the combination of a casing, a shaft, a piston and an abutment arranged within said casing and defining a pair of working compartments, said abutment having a plurality of passageways leading therethrough, remote controlled means for regulating the flow of liquid through said abutment including means whereby the resistance to the flow of liquid therethrough will remain substantially constant irrespective of normal temperature changes.

6. In a hydraulic shock absorber, the combination of a casing, a shaft, a piston and an abutment arranged within said casing and defining a pair of working compartments, said abutment having a plurality of passageways leading therethrough, thermostatically controlled means for regulating the flow of liquid through said abutment, and remote controlled means for further regulating the flow through said abutment.

7. In a hydraulic shock absorber, the combination of a casing, a shaft, a piston and an abutment arranged within said casing and defining a pair of working compartments, said abutment having a plurality of passageways leading therethrough, thermostatically controlled means for regulating the flow of liquid through said abutment, and additional means associated with said first mentioned means for varying the resistance to the movement of said piston in one direction.

8. In a hydraulic shock absorber, the combination of a casing, a shaft, a piston and an abutment arranged within said casing and defining a pair of working compartments, said abutment having a plurality of passageways therethrough and connecting said pair of working compartments, means for oscillating said piston, remote controlled means for regulating the flow of liquid through said abutment to vary the hydraulic resistance to the movement of said piston, and thermostatic means associated with said remote controlled means for maintaining said resistance substantially constant irrespective of normal temperature change.

9. The combination with an automotive vehicle of a hydraulic shock absorber connected between the vehicle frame and axle for checking the relative movement therebetween, hydraulic means for varying the resistance to the movement of the vehicle body with respect to the axle, and thermostatically controlled means for maintaining such resistance substantially constant irrespective of normal temperature change.

10. The combination with an automotive vehicle, of a hydraulic shock absorber connected between the vehicle frame and axle for checking the relative movement therebetween, remote controlled means for varying the resistance to the movement of the vehicle body with respect to the axle, and thermostatically controlled means associated with each of said shock absorbers for maintaining said resistance substantially constant irrespective of normal temperature change.

11. The combination with an automotive vehicle of a shock absorber connected between the vehicle frame and axle for checking the relative movement therebetween, means operable from the driver's seat of the vehicle to adjust said shock absorbers for varying the resistance to such relative movement, and thermostatically controlled means for maintaining such resistance substantially constant irrespective of normal temperature changes.

12. The combination with an automotive vehicle of a shock absorber connected between the vehicle frame and axle for checking the relative movement therebetween, pneumatic means operable from the driver's seat of the vehicle for varying the resistance to such relative movement, and thermostatically controlled means for maintaining such resistance substantially constant irrespective of normal temperature changes.

13. In a hydraulic shock absorber, the combination of a casing, a piston, a shaft and abutment arranged within said casing and defining a pair of working compartments, said abutment having a passageway leading therethrough, a valve in said passageway for regulating the flow therethrough, and means for adjusting the position of said valve to vary the resistance to flow through said passageway, said valve having a plurality of passageways therein of different capacities.

14. In a hydraulic shock absorber, the combination of a casing, a piston, a shaft and abutment arranged within said casing and defining a pair of working compartments, said abutment having a passageway leading therethrough, a valve in said passageway for regulating the flow therethrough, and means for adjusting the position of said valve to vary the resistance to flow through said passageway, said valve being slidably mounted in said passageway and having three annular cut-away portions therein of different capacities.

15. In a hydraulic shock absorber. the combination of a casing, a piston, a shaft and abutment arranged within said casing and defining a pair of working compartments, said abutment having a passageway leading therethrough, and means for adjusting the position of said valve to vary the resistance to flow through said passageway, said valve being substantially circular in shape and having a plurality of annular cut-away portions therein of different capacities.

16. In a hydraulic shock absorber, the combination of a casing, a piston, a shaft and abutment arranged within said casing and defining a pair of working compartments, said abutment having a passageway leading therethrough, and means for adjusting the position of said valve to vary the resistance to flow through said passageway, said valve being slidably mounted in said passageway and having a plurality of peripheral cut-away portions therein disposed one above the other and of different capacities.

17. In a hydraulic shock absorber the combination of a casing, a piston, a shaft and abutment arranged within said casing and defining a pair of working compartments, said abutment having a passageway leading therethrough, a valve in said passageway for regulating the flow therethrough, and means for adjusting the position of said valve to vary the resistance to flow through said passageway, said valve being slidably mounted in said passageway and having three peripheral cut-away portions therein disposed one above the other, the upper cut-away portion being of greater capacity than the intermediate cut-away portion but of less capacity than the lower cut-away portion.

18. In a hydraulic shock absorber, the combination of a casing, a piston, a shaft and abutment arranged within said casing and defining a pair of working compartments, said abutment having a passageway leading therethrough, a valve in said passageway for regulating the flow therethrough, and means for adjusting the position of said valve to vary the resistance to flow through said passageway, said valve having three cutaway portions of different capacity disposed one above the other, the height of the upper portion being greater than the height of the intermediate portion but less than the height of the lower portion.

19. In a hydraulic shock absorber, the combination of a casing, a piston, a shaft and abutment arranged within said casing and defining a pair of working compartments, said abutment having a passageway leading therethrough, a valve in said passageway for regulating the flow therethrough, and means for adjusting the position of said valve to vary the resistance to flow through said passageway, said valve having three cutaway portions disclosed one above the other, the height and depth of the upper cutaway portion being greater than the height and depth of the intermediate cutaway portion but less than the height and depth of the lower cutaway portion.

In testimony whereof, I hereunto affix my signature.

EUGENE LESTER BEECHER.